(12) United States Patent
Kuan et al.

(10) Patent No.: US 11,006,358 B1
(45) Date of Patent: May 11, 2021

(54) RECONFIGURABLE DATA TRANSMISSION SYSTEM WITH TERMINAL DEVICES OF DIFFERENT DATA TRANSMISSION MODES

(71) Applicant: Sercomm Corporation, Taipei (TW)

(72) Inventors: Fan-Yi Kuan, Taipei (TW); Hsin-An Hou, Taipei (TW)

(73) Assignee: Sercomm Corporation, Taipei (TW)

( * ) Notice: Subject to any disclaimer, the term of this patent is extended or adjusted under 35 U.S.C. 154(b) by 0 days.

(21) Appl. No.: 16/223,027

(22) Filed: Dec. 17, 2018

(51) Int. Cl.
*H04W 52/02* (2009.01)
*H04L 12/24* (2006.01)
*H04L 29/08* (2006.01)

(52) U.S. Cl.
CPC ..... *H04W 52/0212* (2013.01); *H04L 41/0893* (2013.01); *H04L 67/12* (2013.01)

(58) Field of Classification Search
CPC ......... H04W 74/0833; H04W 52/0212; H04W 52/02; H04W 60/00; H04W 60/06; H04W 52/0219; H04W 52/0238; H04W 84/18; H04W 68/18; H04W 68/12; H04L 67/12; Y02D 70/162; Y02D 70/142
See application file for complete search history.

(56) References Cited

U.S. PATENT DOCUMENTS

| | | | |
|---|---|---|---|
| 7,904,052 B2 | 3/2011 | Moriwaki | |
| 9,137,769 B2 | 9/2015 | Jung et al. | |
| 2007/0028004 A1* | 2/2007 | Jeong | H04L 51/26 709/248 |
| 2011/0140861 A1* | 6/2011 | Amir | G01S 13/825 340/10.3 |
| 2013/0128786 A1* | 5/2013 | Sultan | H04W 52/0238 370/311 |
| 2014/0185503 A1 | 7/2014 | Roy | |
| 2015/0244774 A1* | 8/2015 | Jang | H04L 67/141 709/203 |
| 2017/0013424 A1 | 1/2017 | Saeki | |
| 2018/0270894 A1* | 9/2018 | Park | H04W 36/0055 |
| 2019/0357297 A1* | 11/2019 | Ben Yizhak | H04W 76/45 |

FOREIGN PATENT DOCUMENTS

| | | |
|---|---|---|
| CN | 104115077 | 12/2018 |
| WO | 2008154321 | 12/2008 |

OTHER PUBLICATIONS

"Office Action of Taiwan Counterpart Application," dated Dec. 23, 2019, p. 1-p. 6.

* cited by examiner

*Primary Examiner* — Ian N Moore
*Assistant Examiner* — Sun Jong Kim
(74) *Attorney, Agent, or Firm* — JCIPRNET (57) ABSTRACT

A data transmission coordination system and a method thereof are provided. In the method, multiple terminal devices are grouped into a first sub-group and a second sub-group. The first and the second sub-groups respectively include at least one of the terminal devices and have different data transmission modes for uploading data. The power consumption of the data transmission mode of the first sub-group is higher than that of the second sub-group. In response to the first terminal device of the sub-group conforming to a replacement condition, a second terminal device of the second sub-group replaces the first terminal device, so that the first sub-group includes the second terminal device. The replaced first terminal device is associated to the second sub-group or not able to transmit depending on an operation situation. Accordingly, a whole lifetime of the system is increased.

8 Claims, 6 Drawing Sheets

RECONFIGURABLE DATA TRANSMISSION SYSTEM WITH TERMINAL DEVICES OF DIFFERENT DATA TRANSMISSION MODES

BACKGROUND

Technical Field

The disclosure relates to a transmission management technique, and particularly relates to a data transmission coordination system and a method thereof.

Description of Related Art

Low Power Wide Area (LPWA) is a wireless communication network applied to Internet of Thins (IoT) for implementing long-distance communication in a low transmission rate. Mobile terminal devices of the LPWA have a special design for power consumption, so as to achieve a battery life of up to ten years. However, in an actual operation, these terminal devices still face following challenges: the battery life varies significantly along with different operation modes; some applications (for example, object tracking or environmental sensing) have too many daily reports; a battery capacity is limited and a power storage capacity is gradually deteriorated along with environmental changes; installation or replacement cost is much higher than the cost of the mobile terminal devices. As shown in a following table (1), under different operation modes and different use environments, the battery life of the mobile terminal device varies significantly. For example, when the mobile terminal device operates in an environment with a coupling loss of 144 dB, and returns 50 bytes of data once a day, the mobile terminal device may last for 36 years; if the mobile terminal device returns 50 bytes of data once every two hours, the battery life of the mobile terminal device is reduced to 22.4 years; and if the report data is increased to 200 bytes once every two hours, the battery life of the mobile terminal device is further reduced to 18.2 years. On the other hand, the report data is fixed to 200 bytes once every two hours, and when the operation environment coupling loss is deteriorated from 144 dB to 154 dB or even 164 dB, the battery life of the mobile terminal device is quickly and gradually reduced from 18.2 years to 5.9 years or even 1.5 years. Obviously, there is a significant difference between such experiment result and the standard demand of 10 years of the LPWA mobile terminal device. If the number of returns for some use situations needs to be further increased to more than 24 times a day, the battery life would be reduced again.

TABLE (1)

| Packet size/ | Battery life (year) Coupling loss | | |
|---|---|---|---|
| return period | 144 dB | 154 dB | 164 dB |
| 50 bytes/two hours | 22.4 | 11.0 | 2.5 |
| 200 bytes/two hours | 18.2 | 5.9 | 1.5 |
| 50 bytes/a day | 36.0 | 31.6 | 17.5 |
| 200 bytes/a day | 34.9 | 26.2 | 12.8 |

On the other hand, considering the use situations of the LPWA mobile terminal device, in addition to indoor use, the LPWA mobile terminal device may also be used in some harsh environments such as outdoors or in the wild. Battery is made up of chemicals, and factors such as high temperature, ultraviolet light, large changes in temperature and humidity, etc., may all accelerate battery degradation and greatly reduce the battery capacity. Moreover, due to the environmental impact, it is difficult to accurately predict a battery life at the time of deployment.

Once the terminal device is unable to work normally due to a power supply factor, in order to maintain a normal operation of a sensing system, a communication terminal has to be reinstalled or updated. In addition to considering construction difficulty increase caused by the environmental factors, in some operating environments, it is required to interrupt the current service in order to complete reinstalling or updating the terminal device. Compared with the construction cost, the cost of the LPWA mobile terminal device is much lower.

Therefore, although the LPWA mobile communication standards provide a specially designed power saving mechanism to the mobile terminal devices, in the actual application, the battery life of mobile terminal equipment will still be shortened or its battery life cannot be accurately estimated due to different operation modes and different use environments.

SUMMARY

The disclosure is directed to a data transmission coordination system and a method thereof, which provides two sub-groups, and is adapted to replace a terminal device therein, so as to improve an overall operation service life of the system, and reduce system maintenance cost.

An embodiment of the disclosure provides a data transmission coordination system including at least two terminal devices and a server. The server groups the terminal devices into a first sub-group and a second sub-group. The first sub-group includes at least one of the terminal devices, and the second sub-group includes at least one of the terminal devices. The terminal devices of the first sub-group and the terminal devices of the second sub-group have different data transmission modes for uploading data to the server, and corresponding power consumption of the data transmission mode of the first sub-group is higher than that of the data transmission mode of the second sub-group. In response to a first terminal device of the first sub-group conforming to a replacement condition, the server replaces the first terminal device by a second terminal device of the second sub-group, so that the first sub-group includes the selected second terminal device. The replaced first terminal device is changed to the second sub-group from the first sub-group depending on a system operation situation or is unable to transmit.

An embodiment of the disclosure provides a data transmission coordination method including following steps. Multiple terminal devices is grouped into a first sub-group and a second sub-group. The first sub-group includes at least one of the terminal devices, and the second sub-group includes at least one of the terminal devices. The terminal devices of the first sub-group and the terminal devices of the second sub-group have different data transmission modes for uploading data to the server, and corresponding power consumption of the data transmission mode of the first sub-group is higher than that of the data transmission mode of the second sub-group. In response to a first terminal device of the first sub-group conforming to a replacement condition, the first terminal device is replaced by a second terminal device of the second sub-group, so that the first sub-group includes the selected second terminal device, and the replaced first terminal device is changed to the second sub-group from the first sub-group depending on a system operation situation or is unable to transmit.

Based on the above description, in the data transmission coordination system and the method thereof of the embodiment of the disclosure, the terminal devices of a specific target or application are grouped into the same group, and the single group is further divided into the first sub-group and the second sub-group. The terminal devices in the two sub-groups have different data transmission modes to upload data to the server. For example, the terminal devices of the first sub-group have a higher transmission frequency or a larger uploading data size. When the terminal device in the first sub-group cannot normally transmit data, the server replaces the terminal device of the first sub-group by the terminal device in the second sub-group. In this way, the overall system service life is effectively prolonged.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
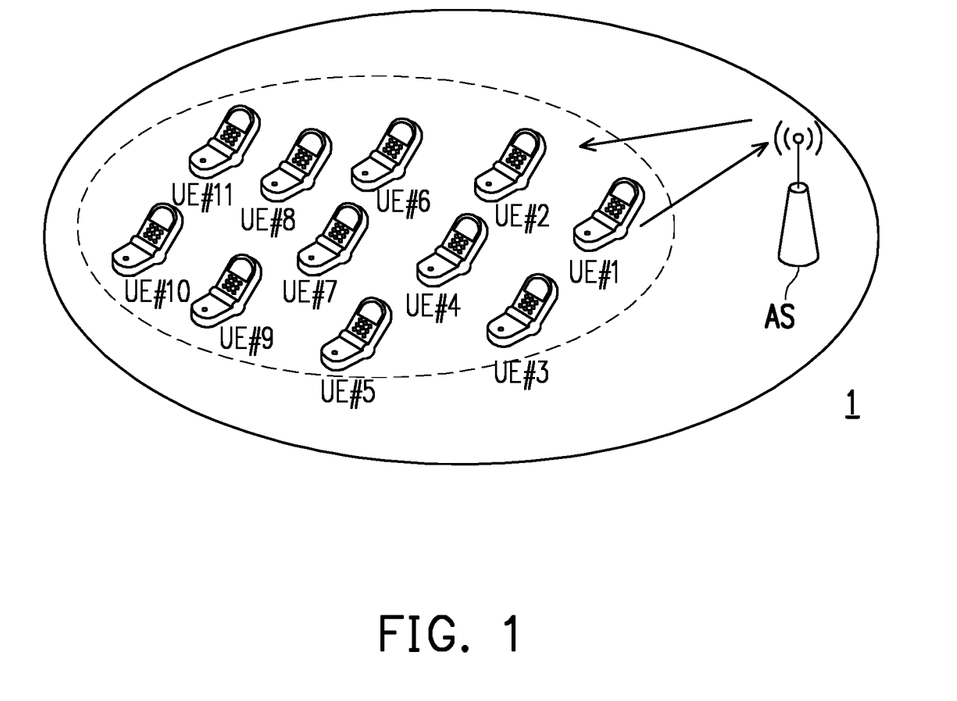
FIG. 1 is a schematic diagram of a data transmission coordination system according to an embodiment of the disclosure.

FIG. 1 is a schematic diagram of a data transmission coordination system 1 according to an embodiment of the disclosure. Referring to FIG. 1, the data transmission coordination system 1 at least includes terminal devices UE #1-UE #11 and a server AS. It should be noted that the number of the terminal devices UE #1-UE #11 is only an example, and in other embodiments, the spirit of the disclosure is met as long as the number thereof is greater than one.

The terminal devices UE #1-UE #11 may have multiple implementations, for example (but are not limited to) mobile stations, Advanced Mobile Stations (AMS), telephone devices, Customer Premise Equipment (CPE), wireless sensors, etc.

The server AS may have multiple implementations, for example (but not limited to), a Home Evolved Node B (HeNB), an eNB, a gNB, an Advanced Base Station (ABS), a Base Transceiver System (BTS), a relay, a repeater, and/or a satellite-based communication base station. The server AS may also be a server (for example, a computer host, various types of server, a work station, etc.) connected to any of the aforementioned transceivers, and translate control commands for terminal devices UE #1~UE #11 through the connected transceiver, and network operations that the transceiver transmit signals to the corresponding terminal devices UE #1~UE #11 and confirmation of reception and execution are all complied with, for example, a 3GPP communication protocol standard.

It is assumed that the terminal devices UE #1~UE #11 are all served by the server AS, and in the embodiment of the disclosure, the terminal devices UE #1~UE #11 directly or indirectly communicate with the server AS based on a Low Power Wide Area Network (LPWAN) communication technique such as a Long Range (LoRa) technique, a Narrow Band Internet of Thing (NB-IOT), a Sigfox, an LTE Advanced for Machine Type Communications (LTE-MTC), etc. In other embodiments, the terminal devices UE #1~UE #11 may also adopt a Wi-Fi, a $3^{rd}$ generation or a later generation mobile communication technique to communicate with the server AS.

In order to facilitate understanding of an operation flow of the embodiment of the disclosure, an operation flow of the data transmission coordination system 1 of the embodiment of the disclosure is described in detail below with reference of multiple embodiments. In the following content, the method of the embodiment of the disclosure is described below with reference of various devices in the data transmission coordination system 1. Various steps of the method of the embodiment of the disclosure may be adjusted according to an actual implementation, which is not limited by the disclosure.

Figure 2:
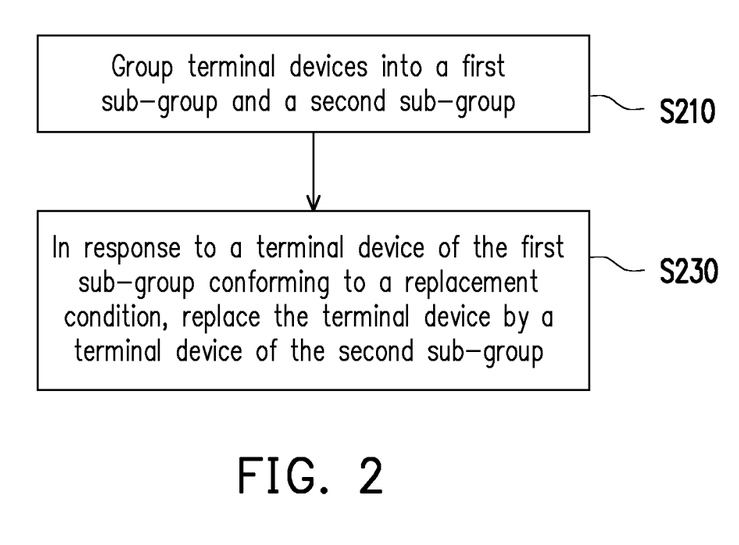
FIG. 2 is a flowchart illustrating a data transmission coordination method according to an embodiment of the disclosure.

FIG. 2 is a flowchart illustrating a data transmission coordination method according to an embodiment of the disclosure. Referring to FIG. 2, the server AS groups the terminal devices UE #1-UE #11 with the same or similar target object or application (for example, PM 2.5 detection, electricity meter measurement, humidity detection, etc.) and/or the same or similar hardware specification (for example, battery, communication technique, etc.) into a same group. It is assumed that the terminal devices UE #1-UE #11 of FIG. 1 all belong to the same group. Regarding all of the terminal devices UE #1-UE #11 in one group, the server AS groups the terminal devices UE #1-UE #11 into a first sub-group and a second sub-group (step S210). To be specific, the first sub-group includes at least one of the terminal devices UE #1-UE #11, and the second sub-group includes at least one of the terminal devices UE #1-UE #11. For example, the terminal device UE #1 is grouped to the first sub-group, and the terminal devices UE #2-UE #11 are grouped to the second sub-group, where an intersection of the first sub-group and the second sub-group is an empty set. The server AS may select one or more terminal devices UE #1-UE #11 randomly or according to a selection rule (for example, a battery status, a received signal state (for example, a Received Signal Strength Indication (RSSI), a Channel State Information (CSI), a signal quality, etc.), a response delay time, identification information (for example, an Internet Protocol (IP) address, etc.)) for grouping to the first sub-group, and select the other terminal devices UE #1-UE #11 for grouping to the second sub-group.

In an embodiment, the terminal devices UE #1-UE #11 of the first sub-group and the terminal devices UE #1-UE #11 of the second sub-group have different data transmission modes for uploading data to the server AS, and corresponding power consumption of the data transmission mode of the first sub-group is higher than that of the data transmission mode of the second sub-group. For example, the data transmission mode of the first sub-group is a normal mode, the data transmission mode of the second sub-group is a low power mode, and parameters such as wakeup frequency, a wakeup time, and/or a size of transmitted data of the normal mode are higher than that of the low power mode, such that the power consumption of the normal mode is higher than that of the low power mode. It should be noted that related configuration settings of the various transmission modes are not limited by the disclosure, which may be adjusted by those skilled in the art according to an actual requirement. The terminal devices UE #1-UE #11 may be set to the corresponding data transmission modes according to the corresponding sub-groups by the server AS, and may operate in the corresponding data transmission mode.

Then, in response to at least one first terminal device of the first sub-group conforming to a replacement condition, the server AS replaces the first terminal device by at least one second terminal device of the second sub-group (step S230), so that the first sub-group includes the second terminal devices. To be specific, for simplicity's sake, the first terminal devices refer to the terminal devices belonging to the first sub-group, and the second terminal devices refer to the terminal devices originally belonging to the second sub-group and selected by the server AS to replace the first terminal devices. The replacement condition is related to inability to continue transmission or other system operation scenes (for example, a battery capacity is lower than a threshold, power outage, a current total number of connections in the first sub-group does not conform to a specific group number, polling, or any fault condition). An overall data amount uploaded by the terminal devices in the first sub-group is probably more than that of the terminal devices in the second sub-group. If the terminal devices in the first sub-group have any abnormality, it is required to immediately or subsequently replenish the terminal devices in the first sub-group, so as to maintain a certain amount of uploaded data.

It should be noted that there are multiple methods that the server AS determines the replacement condition and select the second terminal devices, and five of them are introduced below.

Figure 3:
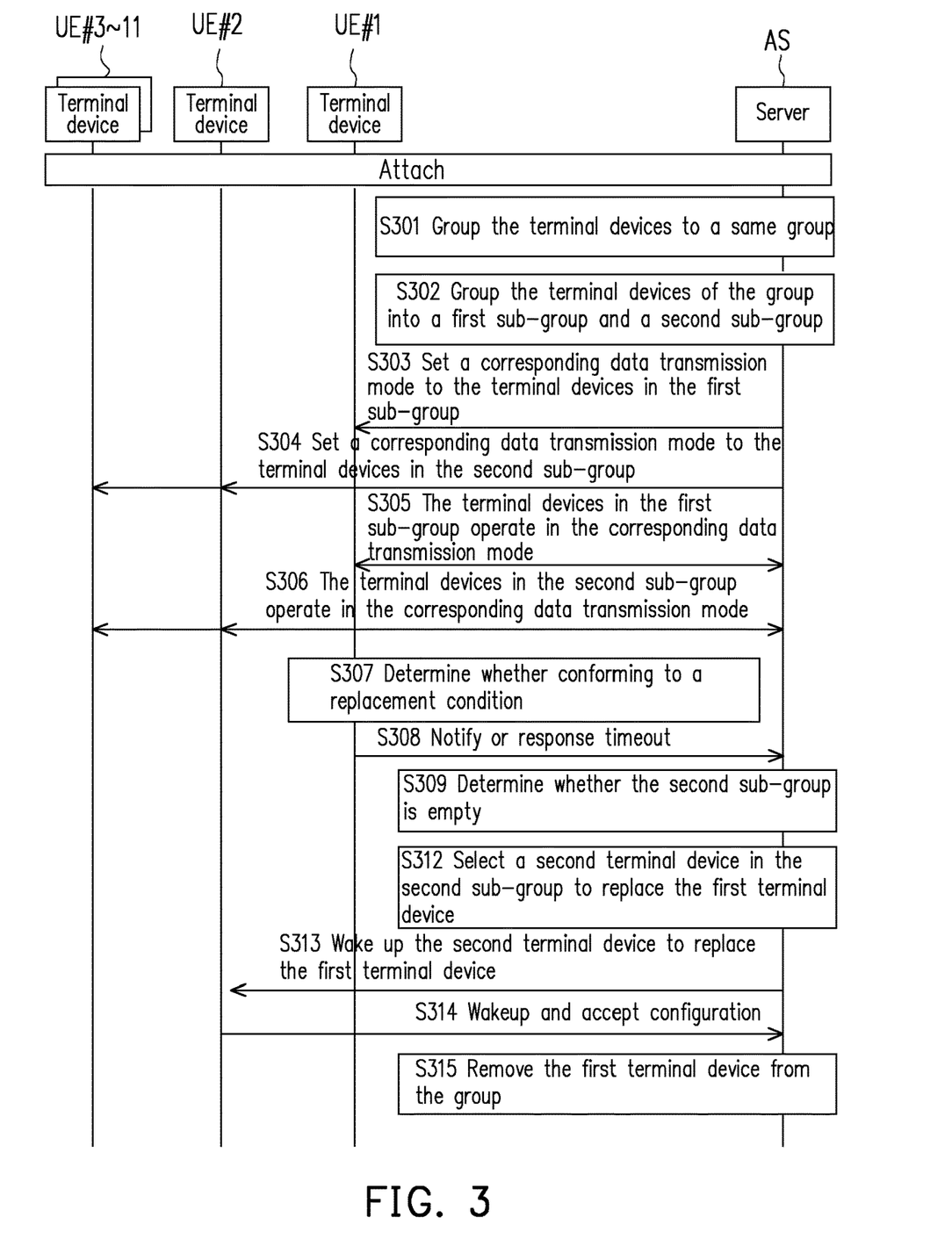
FIG. 3 is a signaling flowchart of a single terminal device mechanism according to an embodiment of the disclosure.

FIG. 3 is a signaling flowchart of a single terminal device mechanism according to an embodiment of the disclosure. Referring to FIG. 3, it is assumed that the terminal devices UE #1-UE #11 are all attached to the server AS. The server AS groups the terminal devices UE #1-UE #11 to a same group according to a target object/application or a hardware specification (step S301). Based on a predetermined selection rule or random selection, the server AS groups the terminal devices UE #1-UE #11 into a first sub-group and a second sub-group (step S302). In the embodiment, the first sub-group is a normal working sub-group, and the second sub-group is a low power sub-group. The server AS, for example, assigns the terminal device UE #1 to the first sub-group, and assigns the other terminal devices UE #2-UE #11 in the group to the second sub-group. The server AS may respectively set corresponding data transmission modes to the terminal devices UE #1-UE #11 in the two sub-groups (step S303, S304). The data transmission mode may be that the terminal devices UE #2-UE #11 in the second sub-group satisfy a long time sensing requirement (for example, a hibernate time is longer than a threshold, an amount of transmitted data is less than a threshold, etc., but they may still be woken up to upload data), and the terminal device UE #1 of the first sub-group maintains a normal work (which has a higher power consumption compared to the second sub-group). Then, the terminal devices UE #1-UE #11 of the first sub-group and the second sub-group operate in the set data transmission modes (i.e. a wakeup, hibernate timing/time and a data amount uploaded to the server AS corresponding to the data transmission mode) (step S305, S306).

The terminal device UE #1 of the first sub-group may determine whether a remaining power quantity of itself is smaller than a specific threshold to serve as a determination basis for determining whether conforming to the replacement condition (step S307). When the terminal device UE #1 detects that its remaining power quantity is less than the specific threshold, the terminal device UE #1 transmits a low power notification to the server AS, or the server AS learns that the terminal device UE #1 is in response timeout (as the server AS learns the corresponding data transmission modes of all of the terminal devices UE #1-UE #11, so that the server AS learns whether each of the terminal devices UE #1-UE #11 does not upload data during a specific time period), i.e. conforming to the replacement condition (the low power quantity or response timeout) (step S308).

When the server AS receives the low power notification of the terminal device UE #1 or finds timeout in packet reception, the server AS first determines whether there are the terminal devices UE #2~UE #11 in the second sub-group (step S309). If there are the terminal devices UE #2~UE #11, the server AS selects one of the terminal devices UE #2~UE #11 randomly or according to a specific selection rule (for example, a battery status, a signal quality, a response delay time, etc.) for moving to the first sub-group to replace the terminal device UE #1 (step S312) until there is no terminal device in the second sub-group.

It is assumed that the terminal device UE #2 is selected to replace the terminal device UE #1, after the terminal device UE #2 is woken up, the server AS assigns the terminal device UE #2 to belong to the first sub-group, and assigns related configuration of the data transmission mode corresponding to the first sub-group to the terminal device UE #2, such that the terminal device UE #2 may replace the terminal device UE #1 (step S313), and the terminal device UE #2 accepts the related configuration of the data transmission mode corresponding to the first sub-group and completes setting after being woken up (step S314). Then, the server AS removes the terminal device UE #1 from the group (step S315). If the terminal device UE #2 is not successfully set to the data transmission mode corresponding to the first sub-group, the server AS turns to the step S307 and selects other terminal devices UE #3-UE #11 in the second sub-group. Moreover, the flow turns to the step S307 and is executed recursively until the there is none of the terminal devices UE #1-UE #11 in the second sub-group.

Figure 4:
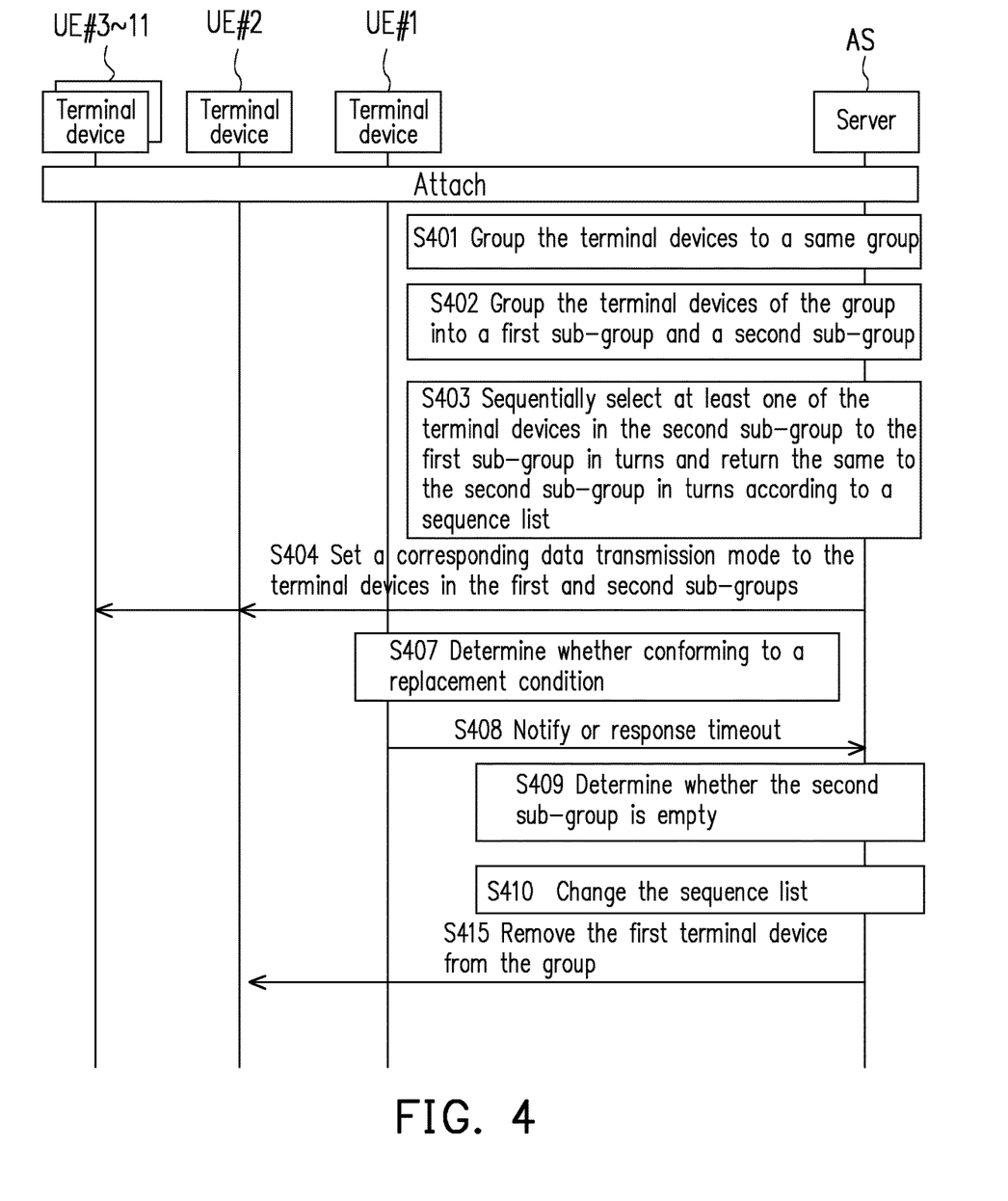
FIG. 4 is a signaling flowchart of a single terminal device polling mechanism according to an embodiment of the disclosure.

FIG. 4 is a signaling flowchart of a single terminal device polling mechanism according to an embodiment of the disclosure. Referring to FIG. 4, descriptions of steps S401, S402, S404, S407, S408, S409 and S415 may refer to related descriptions of the steps S301-S309 and S315 of FIG. 3, and details thereof are not repeated. A difference between the embodiment and the embodiment of FIG. 3 is that the server AS sequentially selects at least one of the terminal devices in the second sub-group to the first sub-group in turns and returns the same to the second sub-group in turns according to a sequence list (step S403). For example, the sequence list is the terminal device UE #1, the terminal device UE #2, the terminal device UE #3, . . . and so on (i.e. a sequence of the referential numbers). The terminal device UE #1 is associated to the second sub-group in a specific period, a specific transmission amount, or through an instruction, and meanwhile the terminal device UE #2 is assigned to the first sub-group. Then, the terminal device UE #2 is returned to the second sub-group, and the terminal device UE #3 is assigned to the first sub-group . . . , and so on. Any of the terminal devices UE #1-UE #11 associated to a different sub-group is changed to the corresponding data transmission mode according to the instruction of the server AS.

In response to a first terminal device of the first sub-group conforming to a replacement condition (a low power quantity or response timeout), the server AS changes the sequence list (step S410). For example, the terminal device UE #1 currently in the first sub-group transmits a low power notification (step S408), and the server AS removes the terminal device UE #1 from the sequence list, and adjusts parameters such as a quantity, a polling frequency and/or a polling period, etc. of the sequence list.

Figure 5:
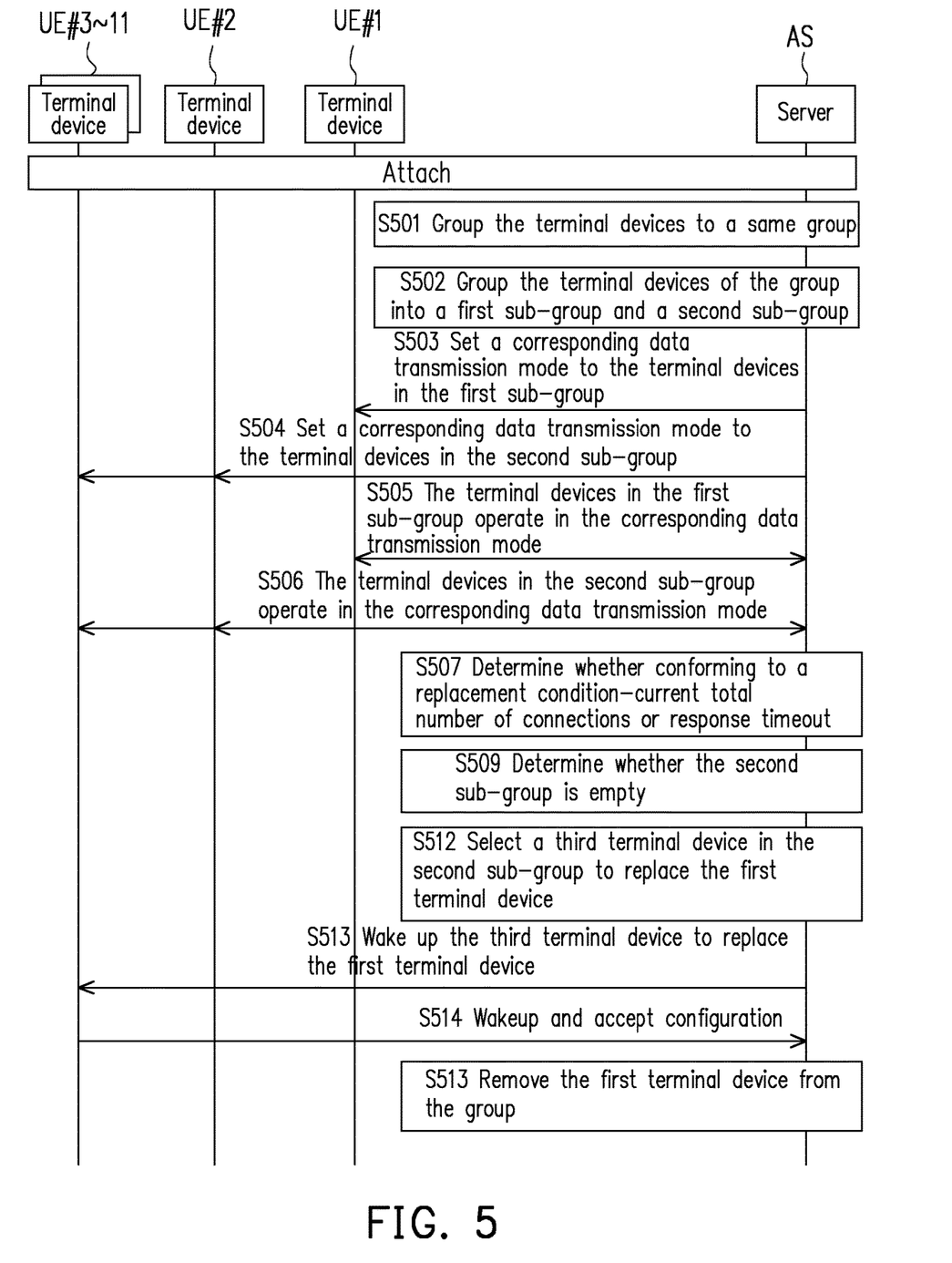
FIG. 5 is a signaling flowchart of a multi-terminal device mechanism according to an embodiment of the disclosure.

FIG. 5 is a signaling flowchart of a multi-terminal device mechanism according to an embodiment of the disclosure. Referring to FIG. 5, descriptions of steps S501-S506, S509 and S513-S515 may refer to related descriptions of the steps S301-S306, S307, S309 and S313-S315 of FIG. 3, and details thereof are not repeated. A difference between the embodiment and the embodiment of FIG. 3 is that more than one of the terminal devices UE #1-UE #11 are assigned to the first sub-group (step S502) (for example, the terminal devices UE #1 and UE #2 in the embodiment), and the server AS determines whether a current total number of connections of the first sub-group is conformed to a specific group number (the total number assigned in the step S502, i.e. the number of the terminal devices in the first sub-group is the specific group number) (step S507) or in case of response timeout, so as to determine whether the terminal devices in the first sub-group are conformed to the replacement condition (i.e. the current total number of connections and response timeout, and it is unnecessary to wait for a warning sent by the terminal device UE #1). If the total number of connections is not conformed (or less than the specific group number) or in case of response timeout, the server AS selects one or more terminal devices UE #3-UE #11 from the second sub-group to associate to the first sub-group (step S512) and replaces the terminal device conformed to the replacement condition in the first sub-group (in the embodiment, the terminal device UE #3 is selected).

Figure 6:
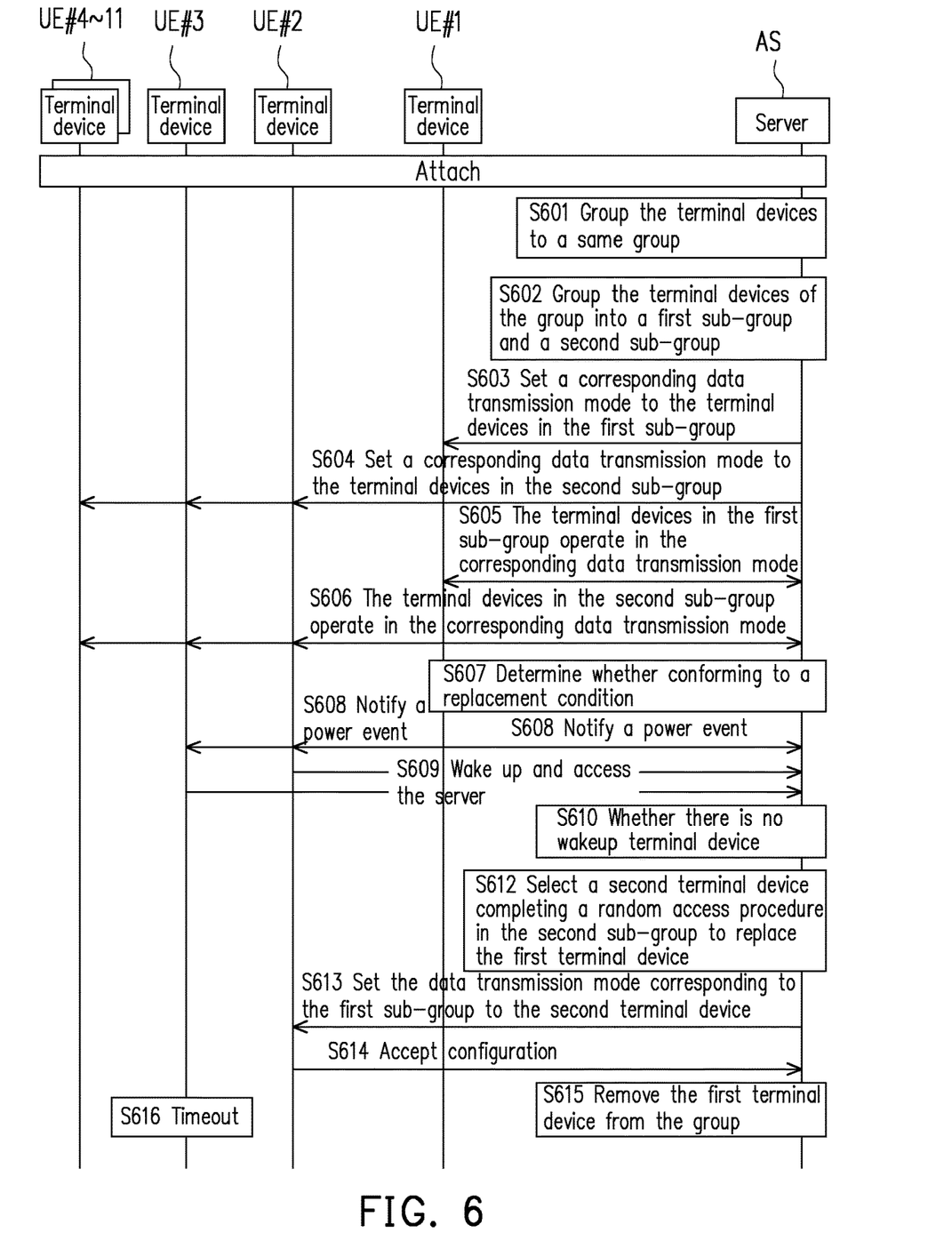
FIG. 6 is a signaling flowchart of a wakeup and random access (RA) mechanism according to an embodiment of the disclosure.

FIG. 6 is a signaling flowchart of a wakeup and random access (RA) mechanism according to an embodiment of the disclosure. Referring to FIG. 6, descriptions of steps S601-S607, S613, S614 and S615 may refer to related descriptions of the steps S301-S307 and S313, S314 and S315 of FIG. 3, and details thereof are not repeated. A difference between the embodiment and the embodiment of FIG. 3 is that in response to the terminal device (for example, the terminal device UE #1 in the embodiment) of the first sub-group conforming to a replacement condition (for example, a power quantity is lower than a threshold, a functional failure, etc.), the terminal device UE #1 transmits a broadcast message (a power event in the embodiment, which may also be other failure warning in other embodiments) to the server AS and the other terminal devices UE #2-UE #11 (step S608). The terminal devices UE #2-UE #11 woken up and receiving the broadcast message execute a random access procedure to the server AS or a connected transceiver thereof (step S609). The server AS confirms whether there is no wakeup terminal device (step S610) (which may be determined by whether a random access message is received). The server AS takes the terminal device completing the random access procedure in the second sub-group (for example, the target terminal device that the server AS or the connected transceiver thereof transmits a random access response to) as the terminal device for replacement (the terminal device UE #2 in the embodiment) (if more than one terminal devices complete the random access procedure, the terminal device is selected according to a specific selection rule (for example, a battery status, a signal quality, etc.)), so as to replace the terminal device UE #1 in the first sub-group (step S612). The other terminal devices UE #3-UE #11 that are timeout to receive the random access response or the broadcast message are maintained in the second sub-group (Step S616).

Figure 7:
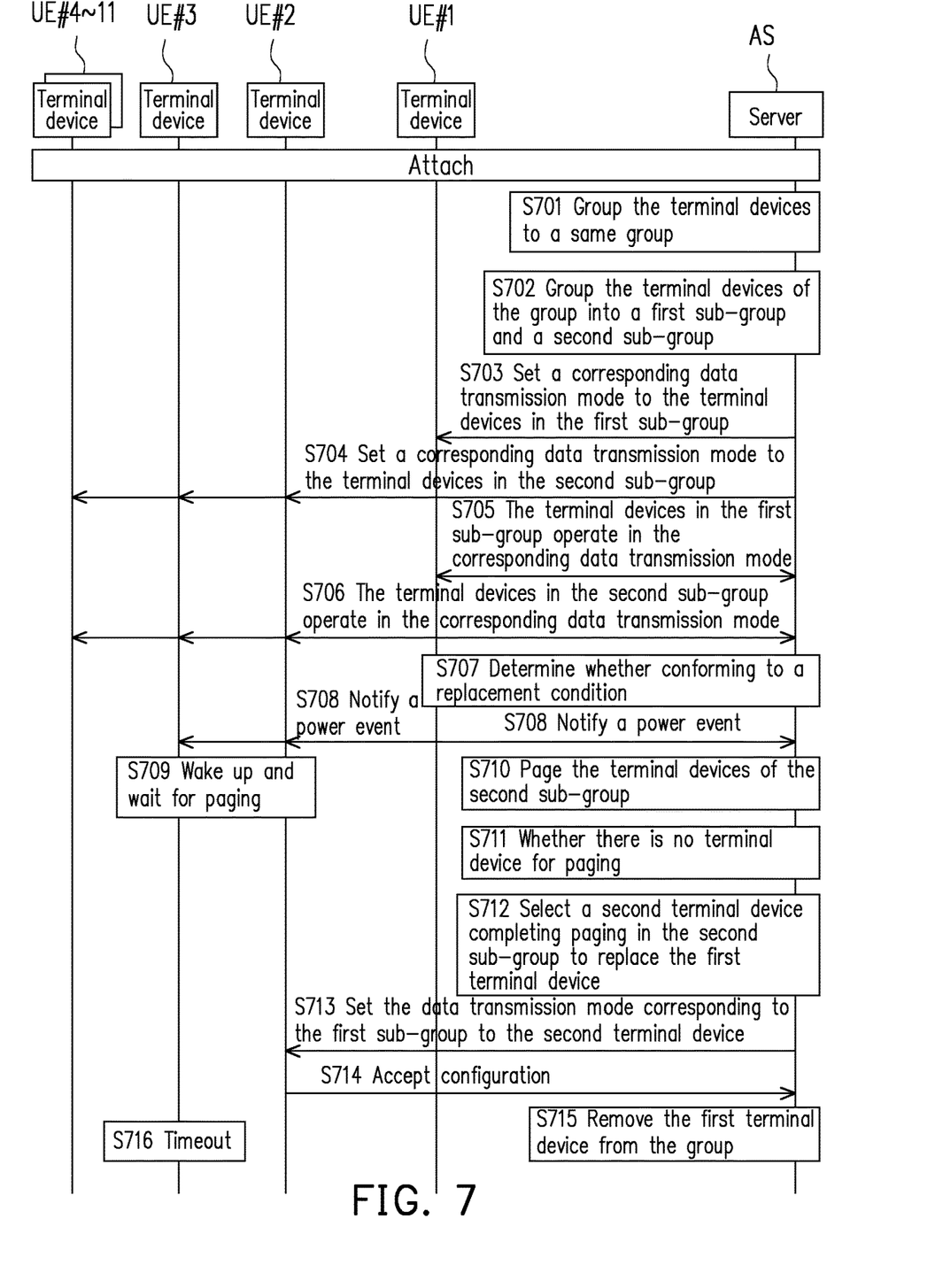
FIG. 7 is a signaling flowchart of a wakeup and paging mechanism according to an embodiment of the disclosure.

FIG. 7 is a signaling flowchart of a wakeup and paging mechanism according to an embodiment of the disclosure. Referring to FIG. 7, descriptions of steps S701-S707, S713, S714 and S715 may refer to related descriptions of the steps S301-S307 and S313, S314 and S315 of FIG. 3, and details thereof are not repeated. A difference between the embodiment and the embodiment of FIG. 3 is that in response to the terminal device (for example, the terminal device UE #1 in the embodiment) of the first sub-group conforming to a replacement condition (for example, a power quantity is lower than a threshold, a functional failure, etc.), the terminal device UE #1 transmits a broadcast message (a power event in the embodiment, which may also be other failure warning in other embodiments) to the server AS and the other terminal devices UE #2-UE #11 (step S708). The terminal devices UE #2-UE #11 woken up and receiving the broadcast message execute an access procedure after receiving the paging message from the server AS or the connected transceiver thereof (step S709). In response to receiving the broadcast message, the server AS or the connected transceiver thereof sends a paging message to the terminal devices UE #2-UE #11 in the second sub-group (step S710). If the server AS confirms whether there is a paging-enabled terminal device (step S711), the server AS takes the terminal device completing the access procedure in the second sub-group as the terminal device for replacement (the terminal device UE #2 in the embodiment) (if more than one terminal devices complete the access procedure, the terminal device is selected according to a specific selection rule (for example, a battery status, a signal quality, etc.)), so as to replace the terminal device UE #1 in the first sub-group (step S712). The other terminal devices UE #3-UE #11 that are timeout to receive the broadcast message, the paging message or the access response are maintained in the second sub-group (Step S716).

It should be noted that in the aforementioned embodiments, the number of the terminal devices, the number of the terminal devices for replacement, the group number in each of the sub-groups, and the replacement condition are only used as an example, which may be modified by those skilled in the art according to an actual requirement.

In summary, in the data transmission coordination system and the method thereof of the embodiments of the disclosure, the terminal devices of a specific target or application are grouped into the two sub-groups, and the terminal devices in the two sub-groups have different data transmission modes to upload data to the server. If the terminal device in the first sub-group conforms to the replacement condition, the server selects one or more terminal devices from the second sub-group for associating to the first sub-group, so as to replace the terminal device in the first sub-group that is assigned to the second sub-group from the first sub-group depending on a system operation situation or cannot continue to operate. In this way, the overall system service life is effectively prolonged.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A data transmission coordination system, comprising:
at least two terminal devices; and
a server, grouping the at least two terminal devices into a first sub-group and a second sub-group, wherein
the first sub-group comprises at least one of the at least two terminal devices, and the second sub-group comprises another at least one of the at least two terminal devices, the at least one terminal device of the first sub-group and the another at least one terminal device of the second sub-group have different data transmission modes for uploading data to the server, and corresponding power consumption of the data transmission mode of the first sub-group is higher than that of the data transmission mode of the second sub-group,
in response to a first terminal device of the first sub-group conforming to a replacement condition, the server replaces the first terminal device by a second terminal device of the second sub-group, so that the first sub-group comprises the second terminal device, wherein
the replacement condition is related to inability to continue transmission,
in response to the first terminal device conforming to the replacement condition, the first terminal device sends a broadcast message including power failure indication of the first terminal device to other terminal devices of the at least two terminal devices and to the server,
the server receives the broadcast message and sends a paging message in response to the broadcast message received from the first terminal device,
at least one third terminal device of the second sub-group is configured to:
receive the broadcast message from the first terminal device and wake up;
wait for the paging message from the server;
receive the paging message from the server; and
execute an access procedure to the server in response to the paging message received from the server, and
the server takes at least one of the at least one third terminal device completing the access procedure based on the paging message as the second terminal device for uploading data, so as to replace the first terminal device.

2. The data transmission coordination system as claimed in claim 1, wherein the server obtains a preconfigured sequence list, the preconfigured sequence list records the at least two terminal devices in order, the server sequentially selects the at least one third terminal device of the second sub-group to the first sub-group in turns and returns the at least one selected third terminal device to the second sub-group in turns according to the preconfigured sequence list, and,
the server removes the first terminal device from the preconfigured sequence list in response to the first terminal device conforming to the replacement condition.

3. The data transmission coordination system as claimed in claim 1, wherein a number of the at least one terminal device of the first sub-group is a group number, the group number is greater than one, and the server determines that a current number of connections in the first sub-group does not conform to the group number, so as to determine that the first terminal device conforms to the replacement condition.

4. The data transmission coordination system as claimed in claim 1, wherein the access procedure is a random access procedure.

5. A data transmission coordination method, comprising:
grouping at least two terminal devices into a first sub-group and a second sub-group, wherein the first sub-group comprises at least one of the at least two terminal devices, and the second sub-group comprises another at least one of the at least two terminal devices, the at least one terminal device of the first sub-group and the another at least one terminal device of the second sub-group have different data transmission modes for uploading data to a server, and corresponding power consumption of the data transmission mode of the first sub-group is higher than that of the data transmission mode of the second sub-group;
in response to a first terminal device of the first sub-group conforming to a replacement condition, replacing the first terminal device by a second terminal device of the second sub-group, so that the first sub-group comprises the second terminal device, wherein
the replacement condition is related to inability to continue transmission;
in response to the first terminal device conforming to the replacement condition,
sending, by the first terminal device, a broadcast message including power failure indication of the first terminal device to other terminal devices of the at least two terminal devices and to the server;
receiving, by the server, the broadcast message from the first terminal device;
sending, by the server, a paging message in response to the broadcast message received from the first terminal device;
receiving, by at least one third terminal device of the second sub-group, the broadcast message from the first terminal device and wake up;
waits for the paging message from the server by the at least one third terminal device of the second sub-group;
receiving, by the at least one third terminal device of the second sub-group, the paging message from the server; and
executing, by the at least one third terminal device of the second sub-group, an access procedure to the server in response to the paging message received from the server; and
taking, by the server, at least one of the at least one third terminal device completing the access procedure based on the paging message as the second terminal device for uploading data, so as to replace the first terminal device.

6. The data transmission coordination method as claimed in claim 5, wherein after the step of grouping the at least two terminal devices into the first sub-group and the second sub-group, the method further comprises:
obtaining, by the server, a preconfigured sequence list, wherein the preconfigured sequence list records the at least two terminal devices in order;
sequentially selecting the at least one third terminal device of the second sub-group to the first sub-group in turns and returning the at least one selected third terminal device to the second sub-group in turns according to the preconfigured sequence list, and in response to the first terminal device conforming to the replacement condition, the method further comprises:
removing, by the server, the first terminal device from the preconfigured sequence list.

7. The data transmission coordination method as claimed in claim 5, wherein a number of the at least one terminal device of the first sub-group is a group number, and the group number is greater than one, and after the step of grouping the at least two terminal devices into the first sub-group and the second sub-group, the method further comprises:
determining that a current number of connections in the first sub-group does not conform to the group number, so as to determine that the first terminal device conforms to the replacement condition.

8. The data transmission coordination method as claimed in claim 5, wherein the access procedure is a random access procedure.

\* \* \* \* \*